(12) United States Patent
Epstein (10) Patent No.: US 8,021,164 B2
(45) Date of Patent: Sep. 20, 2011

(54) METHOD FOR TEACHING (76) Inventor: Allen Epstein, Calabasas, CA (US)

( * ) Notice: Subject to any disclaimer, the term of this patent is extended or adjusted under 35 U.S.C. 154(b) by 1096 days.

(21) Appl. No.: 11/644,157

(22) Filed: Dec. 21, 2006

(65) Prior Publication Data

US 2007/0166691 A1    Jul. 19, 2007

Related U.S. Application Data

(60) Provisional application No. 60/753,766, filed on Dec. 23, 2005.

(51) Int. Cl.
*G09B 7/00* (2006.01)
(52) U.S. Cl. ........................................... 434/322
(58) Field of Classification Search .......... 434/156–185, 434/322–365, 118, 219, 307, 309; 725/45, 725/46, 86, 109–110, 125, 131, 150; 705/14.4; 715/719; 707/3, E17.108
See application file for complete search history.

(56) References Cited

U.S. PATENT DOCUMENTS

| | | | |
|---|---|---|---|
| 4,768,087 A | 8/1988 | Taub et al. | |
| 6,002,768 A | 12/1999 | Albanese et al. | |
| 6,325,632 B1 * | 12/2001 | Chao et al. | 434/322 |
| 6,516,340 B2 | 2/2003 | Boys | |
| 6,595,781 B2 * | 7/2003 | Sutton | 434/276 |
| 6,789,228 B1 | 9/2004 | Merril et al. | |
| 6,845,229 B2 | 1/2005 | Notomi | |
| 6,988,138 B1 * | 1/2006 | Alcorn et al. | 709/225 |
| 7,031,651 B2 * | 4/2006 | McCormick et al. | 434/350 |
| 7,092,669 B2 | 8/2006 | Sakai et al. | |
| 2002/0036694 A1 | 3/2002 | Merril | |
| 2002/0146674 A1 | 10/2002 | Betz et al. | |
| 2003/0039945 A1 | 2/2003 | Dang et al. | |
| 2004/0268413 A1 * | 12/2004 | Reid et al. | 725/131 |
| 2005/0158698 A1 | 7/2005 | Boys | |
| 2006/0199163 A1 | 9/2006 | Johnson | |
| 2006/0228692 A1 | 10/2006 | Seshadri | |

FOREIGN PATENT DOCUMENTS

| | | | |
|---|---|---|---|
| KR | 10-2000-0072458 A | 12/2000 | |
| KR | 10-2002-0007742 A | 1/2002 | |
| KR | 10-2003-0044435 A | 6/2003 | |
| KR | 10-2006-0102893 A | 9/2006 | |

* cited by examiner

*Primary Examiner* — Xuan M Thai
*Assistant Examiner* — Timothy Musselman
(74) *Attorney, Agent, or Firm* — Paul D. Chancellor; Ocean Law (57) ABSTRACT

Aspects of the present invention include one or more of capturing educational presentations by presenters using instructional aids, making productions of these presentations available over an Internet connection to consumers of educational services, aiding selection of a particular topic and a particular presenter, and financially compensating presenters in accordance with the popularity of their educational presentations.

10 Claims, 3 Drawing Sheets

METHOD FOR TEACHING

This application claims the benefit of and incorporates by reference Provisional Application 60/753,766 filed Dec. 23, 2005.

BACKGROUND OF THE INVENTION

1. Field of the Invention

The present invention relates to a method for teaching. In particular, the present invention relates to an improved method for providing educational content.

2. Discussion of the Related Art

Students have been taught using classroom-style educational presentations for millennia. More recently, advances in the arts of computing and communications have enabled students to view educational content remotely. But, most of this educational content is generalized and lacks the breadth and coordination required to effectively cover typical subjects taught in schools and universities. Further, this content cannot generally be used to reinforce educational presentations a student witnesses in the classroom.

Despite advances in these technological building blocks, there remains a long felt need within the United States and other countries for ways and means to improve the educational process. This is especially the case in certain of the public schools of the United States. Despite this need and the large expenditures made by many entities responsible for the public education, the desired improvements have not, in the opinions of many, occurred. What is needed is a method for education that motivates the primary stakeholders, including teachers, teaching institutions and students, to leverage the capabilities of technology to solve this problem.

SUMMARY OF THE INVENTION

Now, in accordance with the invention, there has been found a method for improving education by leveraging the capability to make educational presentations stored in digital media available to users of the Internet. In an embodiment, the method of the present invention includes a method of teaching comprising the step of aiding qualified users in the selection of an educational presentation from among a plurality of educational presentations, such presentations being stored in digital media accessible from the Internet and each such presentation teaching the same topic and being presented by a different presenter, by providing qualified users an indication of the popularity of at least two of the plurality of presentations.

In an embodiment, the method of the present invention is a method of teaching comprising the steps of, for qualified users, providing access via the Internet to a plurality of educational presentations stored in digital media, each said presentation teaching the same topic and being made by a different presenter, collecting financial compensation from a plurality of qualified users and a step for aiding qualified users in the selection of a particular educational presentation from the plurality of educational presentations, and, for at least one presenter, a step for determining an amount of financial compensation to be paid to such presenter.

In some embodiments the step for aiding users in the selection of a particular educational presentation further comprises the steps of obtaining a first indicia of popularity for each educational presentation by tracking the number of times each educational presentation has been replayed, inferring one or more presentation figures of merit from the first indicia of popularity, and, making at least one of the presentation figures of merit available to qualified users for use in selecting a particular educational presentation.

And in some embodiments, the step for aiding users in the selection of a particular educational presentation further comprises the steps of obtaining a second indicia of popularity for each presenter by tracking the number of times each presenter has been replayed, inferring one or more presenter figures of merit from the second indicia of popularity, and, making at least one of the presenter figures of merit available to qualified users for use in selecting a particular educational presentation.

In yet other embodiments, step for aiding users in the selection of a particular educational presentation further comprises the steps of obtaining a first indicia of popularity for each educational presentation by tracking the number of times each educational presentation has been replayed, obtaining a second indicia of popularity for each presenter by tracking the number of times each presenter has been replayed, inferring one or more combined figures of merit, each combined figure of merit being a function of both the first and second indicia of popularity, and making the combined figure of merit available to qualified users for use in selecting a particular presentation.

In another embodiment, the step for determining the financial compensation to be paid to at least one presenter further comprises the step of calculating at such presenter's financial compensation as a function of at least one figure of merit.

And in yet other embodiments, the step for aiding users in the selection of a particular educational presentation further comprises the steps of identifying users who receive regular classroom instruction from presenters carrying out their duties as teachers, and offering any such user the educational presentation made by such user's teacher when such user selects a topic for which an educational presentation by such teacher is stored in the digital media.

BRIEF DESCRIPTION OF THE DRAWINGS

The present invention is described with reference to the accompanying figures. In the figures, like reference numbers indicate identical or functionally similar elements. The accompanying figures, which are incorporated herein and form part of the specification, illustrate the present invention and, together with the description, further serve to explain the principles of the invention and to enable a person skilled in the relevant art to make and use the invention.

DESCRIPTION OF THE PREFERRED EMBODIMENTS

Aspects of the present invention include one or more of capturing educational presentations by presenters using instructional aids, making productions of these presentations available over an Internet connection to consumers of educational services, aiding selection of a particular topic and a particular presenter, and financially compensating presenters in accordance with the popularity of their educational presentations.

Educational presentations include any of dry sessions, class sessions, educational subject matter, topics, subjects, problems and reviews. Such presentations are produced for replay to consumers of educational services such as elementary, secondary school, college and graduate/professional students. In some embodiments educational presentations are produced for hobbyists such as golfers, enthusiasts such as amateur novelists and others.

Figure 1:
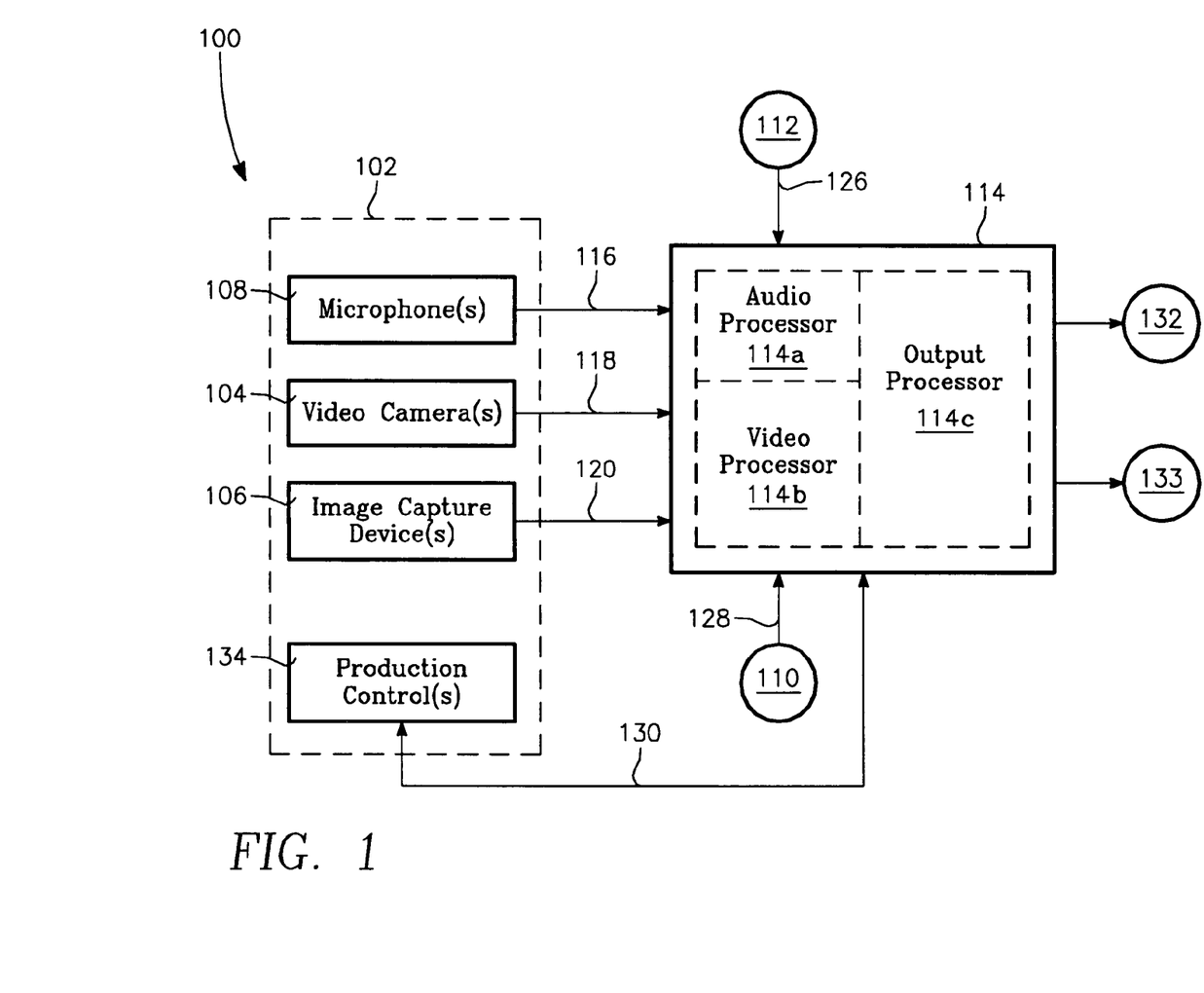
FIG. 1 is a schematic of a setting for capturing an educational presentation according to one aspect of the present invention.

FIG. 1 shows an appropriately equipped setting 100 for capturing an educational presentation. Capturing a presenter's educational presentations occurs in any appropriately equipped setting 102 including for example a classroom or a studio-like setting. As used herein, the term "classroom" embodies these settings. Appropriate capture equipment includes video capture equipment 104 such as hobbyist, web and professional video cameras including CCD type cameras for capturing a video of the presenter, image capture equipment 106 such as electronic whiteboard or document camera for capturing one or more of images and video of instructional aids including handwriting, and audio capture equipment 108 such as a directional microphone for capturing the voice of the presenter. As used herein, the term "video camera" embodies suitable video capture devices, the term "image capture device" embodies suitable image capture devices, the term "microphone" embodies suitable audio capture devices and the term suitable refers to such devices as are known to persons of ordinary skill in the art to be suitable for capturing an educational presentation incorporating the use of instructional aids.

As used herein, presenters includes teachers and others capable of giving educational presentations and, educational presentations include the works of any such presenters that are useful for the purpose of educating. Presented to the users are a visual display including the presenter and selected instructional aids. In addition, the user is presented with the voice of the presenter. In some embodiments, the visual display includes one or more of additional instructional aids 110 such as movie or still image clips and content provided by a guest presenter and the audio includes audio 112 from instructional aids and the guest presenter.

The video signals 118 from the video camera(s) 104, image capture signals 120 from the image capture device(s) 106, and audio signals 116 from the microphone(s) 108 are processed in a multimedia processor 114 to produce and/or package, embed or encode an electronic representation of the educational presentation 132 such as mighty be produced by Microsoft® media products (eg. .wmv file), Quicktime®, or Realplayer®. In some embodiments, additional image capture or video signals 110 and additional audio signals 112 are also processed in the multimedia processor.

In an embodiment, the multimedia processor 114 includes a video processor 114b which receives the video signals 116, an audio processor 114a which receives the microphone signals, and an output processor 114c in signal communication with the video and audio processors. An output of the output processor 132 is a digital representation of the educational presentation including synchronized video and audio suitable for transport over an Ethernet or similar network capable of interfacing with the Internet. In an embodiment, an output of the output processor 133 is an electronic representation of the educational presentation suitable for creating a visual display in the classroom, such as when such electronic representation is received by a video projector or classroom computer. In some embodiments, additional image capture or video signals 110, such as video of a guest presenter, are processed by the video processor 114b and additional audio signals 112, such as pre-recorded music, are also processed in the audio processor.

The video processor 114b provides video switching functions for selecting among video sources 118, 120, 112. In an embodiment, the video processor enables formatting the visual display including picture-in picture functionality for producing video displays having multiple frames such as a first frame displaying the presenter and one or more additional frames displaying other video or image content available to the multimedia processor 114. In some embodiments, the video processor provides transitions and background and foreground graphics to create four-layer effects.

The audio processor 114a provides audio switching and mixing functions for selecting among audio sources 116, 110 and mixing those sources. In an embodiment, the audio processor in combination with the video processor 114b provides synchronization between one or more audio sources and one or more video sources 118, 120, 112.

The output processor 114c provides the electrical interface between the audio and video processors 114a,b and the multimedia processor output 132. In some embodiments, the output processor includes an automated closed captioning feature capable of converting any of the audio sources 108, 112 into representative text in various languages and displaying the text in one or more frames of the visual display. And in some embodiments the audio of the presenter is replaced by a foreign language translation of the presenter audio.

In various embodiments, the multimedia processor 114 is one or more of an analog device, a digital device or a hybrid device. Where digital signals are inputs to the multimedia processor, they may be derived from a digital source such as a digital video camera or in the alternative result from an intermediate analog to digital conversion such as the conversion of an analog microphone signal to a digital representation of that signal. Similarly, where digital signals are inputs to the multimedia processor, they may be derived from an analog source such as an analog microphone or in the alternative result from an intermediate digital to analog conversion such as the conversion of a digital video camera signal to an analog representation of that signal.

A production control unit 134 is in signal communication 130 with the multimedia processor 114. The production control unit provides a man-machine interface to the multimedia processor for controlling the combined video-image-audio production of the educational presentation. In an embodiment (as shown), the production control unit is located in the classroom and is available to the presenter for pre-production set-up and adjustments made during the educational presentation for enhancing the effectiveness of the presentation.

An output of the multimedia processor 132 is a digital representation of the educational presentation. This representation or a version of it is stored in digital storage media ("storage device") such as magnetic media, optical media, semiconductor media or another suitable media known to persons of ordinary skill in the art.

In various embodiments, one or more elements of the multimedia processor 114 may be embodied in a personal or other general or special purpose computer utilizing appropriate software such as Camtasia® (by TechSmith) and the like. In an embodiment, a discrete multimedia processor comprising a video processor and audio processor, such as the FOCUS MX-4 DV Digital Video Mixer or the Sony BVS-3200CP vision mixer, provides functionality similar to that of the multimedia processor 114 of the present invention.

Figure 2:
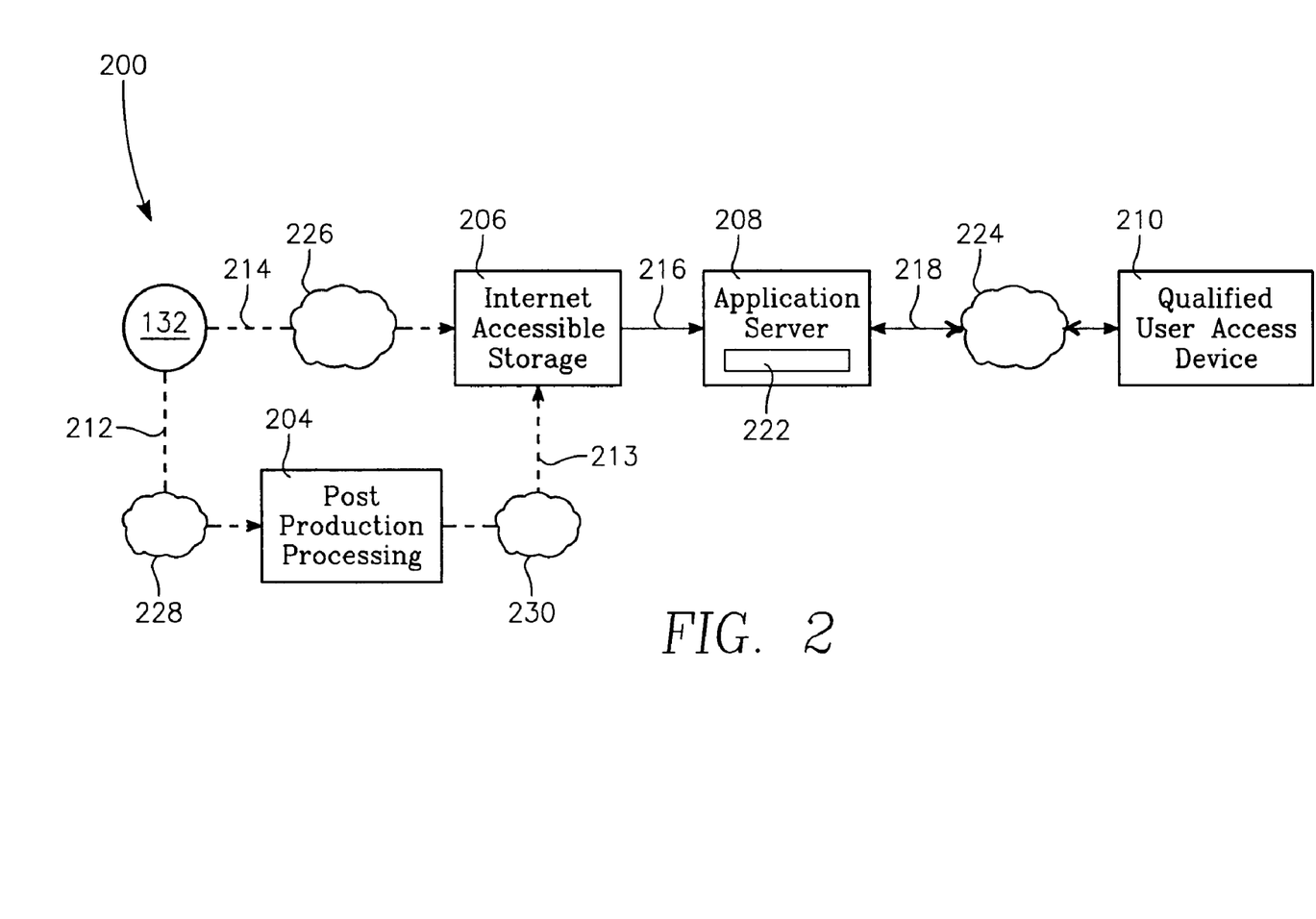
FIG. 2 is a schematic of a computing and communications infrastructure according to a second aspect of the present invention.

FIG. 2 shows a computing and communications infrastructure 200 for making educational presentations available via the Internet. Signal link 216 interconnects an application server 208 with an Internet accessible storage device 206 and signal link 218 interconnects the application server with user access devices 210 such as qualified user access devices. The digital representation of the educational presentation 132 is transmitted over signal link 214 and stored in the Internet accessible storage device 206. Access devices are devices such as personal computers, cell phones, virtual reality devices, personal digital assistants and the like 210 gain access to the stored presentations under control of the application server 208 running access and management software 222. Selection of a particular educational presentation by a user results in replay of the selected presentation or content. As used herein, "replay" includes streaming the content to a user's access device and downloading a digital representation of the content to a storage device available to a user's access device.

Suitable access and management servers include general purpose computer processors running Internet server software such as that offered by Microsoft® or Apache brand software and configured with an appropriate communications interface such as an Ethernet 10baseT interface. In an embodiment, the Internet accessible storage device receives the educational presentations via a post-production processing facility 204 having functionality similar to that in the multimedia processor 214 and typically operated by a person known as a "vision and audio mixer." Here, the post-production processor receives the digital representation of the educational presentation over signal link 212 and transmits it, after post-production is completed, to the Internet accessible storage over signal link 213. In various embodiments one or more of signal links 212, 213, 224 and 226 pass through the facilities of an Internet Service Provider.

The term "signal link" as used herein may be any digital transmission means including physical electrical conductors, physical optical conductors, any wireless means including the various IEEE 802 standards, and any other means of signal transmission known to persons of ordinary skill in the art. The term "server" as used herein is broadly understood to mean any computing entity or family of such entities capable of responding to user requests over a network. The computing entities may be computer servers or server farms, general purpose digital computers, or special-purpose devices such as those having digital processors built in. The family of computing entities may be geographically distributed or may be "virtual" entities within a larger entity.

Similarly, "storage" or "storage device" when used here, is broadly understood to mean any of storage physically associated with a single location such as the storage devices of a particular educational institution or a particular internet service provider, storage distributed among a plurality of geographic locations including distributed storage which is accessible through an indexing means residing in a single location, and storage distributed as a part of a peer-to-peer file sharing application having indexing which may itself be distributed among a plurality of geographic locations.

A general purpose computer or application server of the present invention 208 utilizes application software 222 that provides for limited Internet access to educational presentations and performs various management functions. The limited access functionality of the software qualifies users who have exchanged financial compensation for use of the system or who have been granted access without financial compensation. Limiting access of Internet users to the educational presentations is accomplished by qualifying users. In various embodiments, qualification of a user includes one or more of qualification based on financial compensation received from the user, need based qualification, qualification on a trial basis, qualification as a presenter, and qualification for purposes of quality control and/or application monitoring.

In the present invention, not one, but a plurality of educational presentations are made available for selection by qualified users. Providing access to multiple presentations made by multiple presenters on the same topic lays a foundation for creating a competitive environment among presenters since consumers are given a choice. The management functionality of the software includes, processes for indexing and navigating to educational presentations, and retrieving and replaying lessons selected by qualified users. In various embodiments, the plurality of educational presentations includes one or more of multiple presentations by multiple presenters on a given topic, multiple presentations on a given topic by a single presenter, such as a course consisting of a series of topics, and a series of presentations by a plurality of presenters forming all or portions of a particular course.

Educational presentations may be identified according to any suitable indicia and system of indexing. For example, metadata such as one or more of the presenter's name, educational presentation title, production date, level, subject area, branch, course, topic, textbook, chapter, section and similar indicia provide one or more means of identifying a particular presenter or presentation. Other examples include functionality for searching within the audio, video or image portions of the presentation for particular phrases or content.

Figure 3:
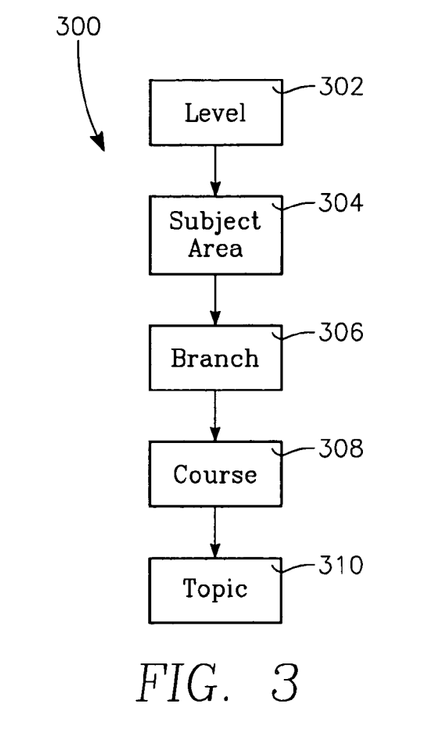
FIG. 3 is a depiction of a generalized navigating scheme according to a third aspect of the present invention.

In an embodiment, a generalized navigation scheme is used. FIG. 3 shows a generalized navigating scheme 300. Here, the educational presentation is located by selecting in sequence the level (for example elementary, secondary, college, graduate, post-graduate or the like) 302, subject area (for example English, math, social sciences, life sciences, earth sciences or the like) 304, branch (for example English literature, English Grammar, English Poetry and the like) 306, course (for example beginning, intermediate, advanced and the like) 308, and topic (for example gerunds, infinitives, proper nouns and the like). Upon making each of these choices, any of one or more stored or live presentations available on the particular topic are presented.

Figure 4:
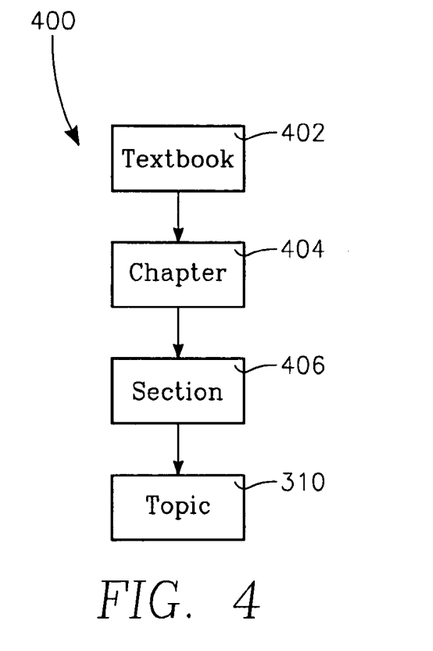
FIG. 4 is a depiction of a particularized navigating scheme according to an alternative aspect of the present invention.

FIG. 4 shows another embodiment where a particularized navigating scheme 400 is used. Here, the educational presentation is located by selecting in sequence the textbook, chapter, section, and topic. Upon making each of these choices, any of one or more presentations available on the particular topic are presented. In an embodiment, a textbook lookup function provides locating a particular textbook by ISBN number, author, title and the like.

Figure 5:
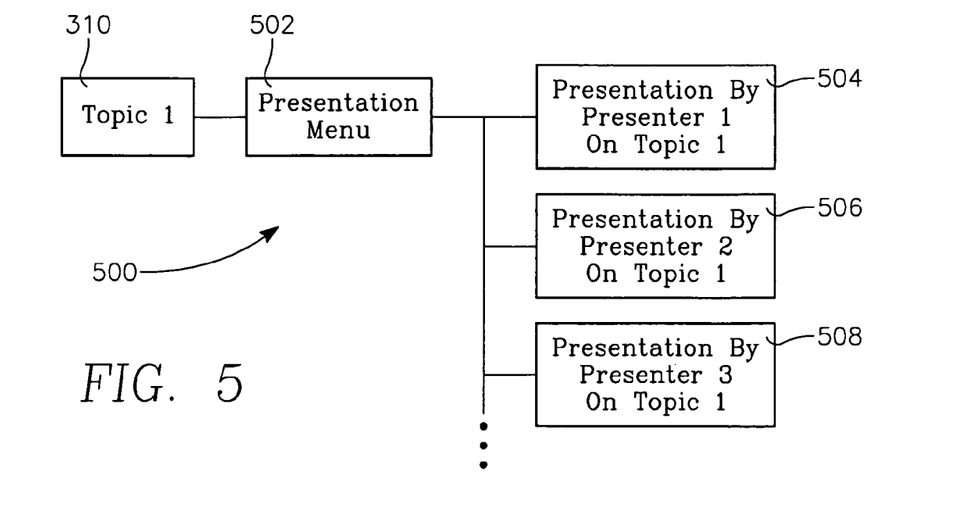
FIG. 5 is a depiction of a presenter menu according to a fourth aspect of the present invention.

It is an advantage of the present invention that it creates a competitive marketplace for consumers of educational services by providing a choice among multiple presentations by multiple presenters relating to a particular topic. Thus in one such exemplary embodiment, a qualified user is presented with a first plurality of presentations wherein each of a second plurality of presentations is presented by a different presenter. As an example, FIG. 5 shows a presenter menu 500 wherein a presenter menu extends from a particular topic 310 and three presentations by different presenters extend from the presenter menu; the presentations of a) Presenter 1 on Topic 1, b) Presenter 2 on Topic 1, and c) Presenter 3 on Topic 1. By enabling a qualified user to choose from among several presentations on the same topic, a competitive marketplace is created wherein presenters compete for replays by consumers of educational services.

Qualification based on financial compensation received from the user results when the management software recognizes a particular user has paid a requested amount, such as through notification from PayPal® or another online payment service or when another pays directly or indirectly for the benefit of one or more users such as a payment made by a school district. Need based qualification occurs when third party or other reliable information concerning need is provided to an administrator of the present invention or through the management software such as notice that a user is eligible for subsidized public school meals. Trial basis qualification is provided to potential users requesting a trial account from the management software; such new users are identified by the management software based on information submitted by the potential user or otherwise acquired when the new user communicates with the management software. Typical trial user verifications include a comparison of the potential user's email address to the email addresses known by the present invention to be associated with past or present qualified users. Presenters become qualified users by virtue of having one or more educational presentations available to qualified users. Other qualified users include those persons having responsibilities for quality control and/or application monitoring of the present invention.

In an embodiment, profiles of potential users are obtained and stored by the management software 222 during the qualification process. Where the potential user is a student, the profile will typically include information relating to the learning institution and presenters the student is associated with, if any, and the learning styles best suited to the student such as visual learner, audible learner, accent, English fluency, and the like. And, in various embodiments, profiles of the presenters are obtained by one or more of the user qualification process above and entry at the time of pre or post production by the presenter or on the presenter's behalf. The presenter profiles will typically include a bio of the presenter and an indication of the types of student learning styles best suited to the presenter's presentation style.

Financial transactions performed by the management software include one or more of presenting new users or qualified users with requests for compensation, receiving compensation, and verifying that compensation has been received. In an embodiment, a potential user requesting access to educational presentations is presented with options and corresponding amounts to purchase a particular presentation, a particular set of presentations or unlimited access. Potential users desiring to complete the financial transaction are directed to enter the credit card or other account which will be used to satisfy the management software's request for compensation. Upon confirmation that the request has been satisfied, the user's account is updated by the management software to recognize receipt of payment. In some embodiments, the management software provides a link to a funds transfer service such as PayPal®. The funds transfer service in turn provides secure transfer of funds from a user's existing credit card or bank account to an email address associated with the present invention's owners, operators, designated beneficiaries or their agents, the same being designated to receive such payments.

The management software functionality also includes processes for generating statistics indicative of popularity of presentations and presenters, and conducting financial transactions. Statistics indicative of presentation and presenter popularity include tracking the number of times each educational presentation has been replayed and the number of times each presenter has been replayed. Such statistical data provide a quantitative means for enabling qualified users to select the most popular presentations and/or presenters. In an embodiment, this tracking functionality is implemented by constructing a popularity array having a number of rows equal to the total number of presentations "np" tracked by the management software. Table 1, Array Structure, shows the structure of one such array.

TABLE 1

Array Structure

| $i^{th}$ Presentation | $k^{th}$ Topic | Presenter | Presentation Replays | Presenter Replays | | |
|---|---|---|---|---|---|---|
| | | | | Presenter 1 | Presenter 2 | Presenter 3 |
| 1 | 1 | presenter 1 | r1 | r1 | | |
| 2 | 2 | presenter 1 | r2 | r2 | | |
| 3 | 1 | presenter 2 | r3 | | r3 | |
| 4 | 3 | presenter 3 | r4 | | | r4 |
| 5 | 3 | presenter 1 | r5 | r5 | | |
| 6 | 3 | presenter 2 | r6 | | r6 | |
| 7 | 1 | presenter 3 | r7 | | | r7 |
| 8 | 2 | presenter 2 | r8 | | r8 | |
| 9 | 2 | presenter 3 | r9 | | | r9 |
| | | | totals | tot1 | tot2 | tot3 |
| | | | entries | 3 | 3 | 3 |
| | | | average | tot1/3 | tot2/3 | tot3/3 |

In a representative embodiment, the management software tracks a total of "np" presentations, a particular presentation being the $i^{th}$ presentation, and a total of "nt" topics, a particular topic being the $k^{th}$ topic. In this example embodiment, each of the presentations is by one of three presenters identified as Presenter 1, Presenter 2, or Presenter 3. For each presentation, a corresponding counter "presentation replays" maintains a numeric value "$r_i$" equal to the number of times the presentation has been replayed. The popularity of a particular presentation is therefore indicated by its corresponding $r_i$ value in the presentation replays column.

Here, an indication of the popularity of a particular presenter is maintained in presenter columns in the popularity array. In each presenter's column, the number of presentation replays corresponding to a particular presentation is entered if the presenter made the presentation. For example, in the Presenter 1 column of the popularity array, the values r1, r2 and r5 are entered by the management software since these replays relate to presentations made by Presenter 1. An indication of the popularity of Presenter 1 is therefore "tot1" which is the total number of presentation replays credited to Presenter 1 (r1+r2+r5): Another indication of the popularity of Presenter 1 is "tot1/3" which is the average number of replays of each of Presenter 1's presentations ((r1+r2+r5)/3).

In an embodiment, indicated presentation popularity and indicated presenter popularity serve as "figures of merit," or as a basis for deriving and/or inferring figures of merit, for use by qualified users in selecting a particular presentation. Figures of merit also include mathematical functions of one or more of the indicated presenter popularity and indicated presentation popularity such as sums, averages and statistical functions known in the art of any of these values. Still other figures of merit may also be derived and/or inferred from indicated popularities by, for example, combining the indicated presentation popularity and the indicated presenter popularity. As a further example, Table 2, Popularity Array, contains the following data.

TABLE 2

Popularity Array

| $i^{th}$ Presentation | $k^{th}$ Topic | Presenter | Presentation Replays ($r_i$) | Presenter Replays Presenter 1 | Presenter 2 | Presenter 3 |
|---|---|---|---|---|---|---|
| 1 | 1 | presenter 1 | 12 | 12 | | |
| 2 | 2 | presenter 1 | 22 | 22 | | |
| 3 | 1 | presenter 2 | 12 | | 12 | |
| 4 | 3 | presenter 3 | 4 | | | 4 |
| 5 | 3 | presenter 1 | 3 | 3 | | |
| 6 | 3 | presenter 2 | 15 | | 15 | |
| 7 | 1 | presenter 3 | 8 | | | 8 |
| 8 | 2 | presenter 2 | 13 | | 13 | |
| 9 | 2 | presenter 3 | 28 | | | 28 |
| | | totals | 37 | 40 | 40 | |
| | | entries | 3 | 3 | 3 | |
| | | average | 12.3 | 13.3 | 13.3 | |

A qualified user seeking educational services relating to topic 1 has three presentations to choose from (1, 3 and 7) and each of these presentations has a presentation replay count (12, 12 and 8). Given these values, a qualified user might likely select either of Presenter 1 or Presenter 2 (Set 1=(Presenter 1, Presenter 2)).

In similar fashion, a qualified user seeking educational services relating to topic 1 has three presenters to choose from (Presenters 1, 2 and 3) and each of these presenters has a presenter replay count (37, 40 and 40) and a normalized presenter replay count (12.3, 13.3 and 13.3). Given these values alone, a qualified user might likely select either Presenter 2 or Presenter 3 (Set 2=(Presenter 2, Presenter 3)). However, if the qualified user also has access to the presentation replay counts, he might likely select Presenter 2 as the "best" given the replay counts for both presentations and presenters support this choice. In an embodiment, a combined figure of merit considering both popularity of the presentation and popularity of the presenter, the intersection of Sets 1 and 2, is made available to qualified users as an aid in selecting a particular presentation.

As will be understood by persons of ordinary skill in the art, the popularity statistics discussed above may also be generated in a similar fashion for subject area 304, branch 306, and course 308. In an embodiment, presentation of these intermediate popularity statistics, for example during the navigation process, provides qualified users with additional criteria for selecting particular presenters.

In an embodiment, the time period from which the replay data is selected is pre-determined. In some embodiments the time period from which the replay data is selected is selectable by a qualified user. This functionality is of particular interest for example where data is available for a presenter over a relatively long period of time and the replay counts for the presenter and the presenter's related presentations have experienced significant change with time. And in some embodiments, it is only when selected users, such as students, request an educational presentation that a replay occurs for the purposes of popularity statistics.

Further, persons of ordinary skill in the art will recognize that the method(s) described above for monitoring the popularity of selected content on the Internet is but one of many similar methods that may be implemented on a general purpose computer running suitable software. For example, students who are qualified users may provide a rating of the presentation during a session and these ratings may also be used to identify for future qualified users the most popular presentation(s). In addition, qualified users participating in forums hosted by a web site offering the service of the present invention may provide popularity data for the purpose of obtaining and making available to qualified users additional ranking data.

In various embodiments, the present invention includes one or more of systems and methods for matching qualified users with appropriate presenters, acquiring educational presentations, rewarding presenters, protecting copyrights subsisting in educational presentations, and reinforcing instruction users have previously received.

In addition to the methods for selecting presentations and presenters above, in an embodiment students who are qualified users are matched with appropriate instructors. This matching is accomplished by analyzing profiles provided by each presenter and each student who is a qualified user. For example, a presenter profile evidencing a presentation style best suited for visual learners will be suggested by the management software to students whose profile suggests a preference for this learning style. Other examples include matching accents such as matching an Hispanic presenter with an Hispanic student.

In an embodiment, educational presentations are acquired under an exclusive contract with entities employing presenters. For example, a particular school board or university entity is solicited and offered a contract which includes selected faculty members. Motivation for entering such a contact includes one or more of free access for selected students, improved student knowledge and performance such as higher standardized test scores, public relations, financial compensation for the employing entity and financial compensation for the presenter.

Financial compensation for presenters is, in an embodiment, dependent upon one or more of the afore mentioned or similar figures of merit derived from statistics of the popularity of presentations and presenters. In some embodiments, a fraction of the net income resulting from operation of the present invention is set aside as compensation for presenters. For example, for a particular period of time, a presenter's replays are calculated as a fraction of the total replays and the presenter's financial compensation is that percentage multiplied by the net income set aside during the period. (e.g. [(tot1/sum(r1 ... r9)*net income set aside]) (See Table 1). Financial compensation paid to presenters based on the popularity of their educational presentations tends to increase competition among presenters since presenters have a financial stake in making educational presentations and in improving the popularity of their presentations. And in some embodiments, presenters must reach a threshold level of presenter and/or presentation popularity, such as the upper quartile, before any financial compensation is paid.

Financial compensation for the entity is, in an embodiment, dependent upon the financial compensation awarded to presenters. Here, a fraction of the compensation received by the employees of the entity is paid to the entity. For example, where the employees of an entity receive total compensation of $100 in a particular period, the entity would receive compensation equal to 25% of this amount or $25. Financial compensation paid to the employers of presenters based on the popularity of the employees educational presentations tends to increase competition among presenters since it can be expected that financial compensation to employers will motivate employers to encourage employees to make educational presentations and to improve the popularity of those presentations. Still other methods of allocating a fixed amount or a fraction of a fixed amount to potential recipients such as presenters and/or their employers, including need based allocations and allocations based on standardized test scores, are known to persons of ordinary skill in the art.

In some embodiments, financial compensation is also provided to qualified users who are students. Here, such students become eligible to receive financial compensation based on merit, and in particular, merit associated with the student's academic performance as evidenced by improved performance or reaching a quantified level of performance. Typical performance metrics include standardized test scores.

Presenters typically have copyrights subsisting in the educational presentations of the present invention. In addition a third party, such as a university employing a presenter, may have acquired rights in the work(s) of an employed presenter. In an embodiment of the present invention, presenters and third party rights holders assign their copyrights in particular educational presentations to an entity ("the copyright transferee") who holds those rights for the benefit of the owners, operators, qualified users and/or beneficiaries of the present invention.

In an embodiment, the rights of the copyright transferee are in turn protected by one or more of licenses executed as a condition of becoming a qualified user and managing digital rights via protecting and securely delivering educational presentations for playback on qualified user access devices 210 including computers, portable devices, and network devices. Suitable Digital Rights Management ("DRM") platforms known in the art include Microsoft Media Digital Rights Management and Apple's Fairplay Digital Rights Management System (Microsoft and Apple are registered trademarks of Microsoft Corporation and Apple Computer, Inc. respectively.) Where the Microsoft product is used, the DRM software typically resides on the application server 208 and no corresponding special purpose client application will be required on a qualified user access device.

Some presenters will have students attending their educational presentations who are qualified users of the present invention ("attending qualified users"). For example, users who receive regular classroom instruction from presenters carrying out their duties as teachers. In an embodiment, this relationship can be identified by the management software. For example, the relationship may be identified by one or more of information the student provides during the process of becoming a qualified user, information the presenter or one acting on behalf of the presenter or the presenter's employer provides before or during the time a student is enrolled in the related class, or other similar methods. Notably, the access granted an attending qualified user may be denied in cases where that user fails to physically attend live classes of the presenter.

In an embodiment of the present invention, a hybrid topic selection process is presented to attending qualified users. Here, an attending qualified user requesting a topic available from his instructor will be offered the presentation of his instructor first. If the student declines this offer, all of the selection methods discussed above are then made available to guide the student in the selection process. In an embodiment, this hybrid functionality offers attending qualified users their own instructor in a manner similar to the Google® presentation of a paid search link, the offering of the user's own instructor being presented in similar manner to the offering of a paid search link.

While various embodiments of the present invention have been described above, it should be understood that they have been presented by way of example only, and not limitation. It will be apparent to those skilled in the art that various changes in form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of teaching comprising the processor implemented steps of:
    providing academic educational presentations created by educators for the benefit of school students;
    for qualified users, providing access via the Internet to the educational presentations stored in digital media, each said presentation teaching the same topic and being made by a different presenter;
    collecting financial compensation from a plurality of qualified users;
    aiding qualified users in the selection of a particular educational presentation from the plurality of educational presentations;
    for at least one presenter, determining an amount of financial compensation to be paid to such presenter;
    obtaining a first indicia of popularity for each educational presentation by tracking the number of times each educational presentation has been replayed;
    obtaining a second indicia of popularity for each presenter by tracking the number of times each presenter has been replayed;
    the processor inferring one or more combined figures of merit, each combined figure of merit being a function of both the first and second indicia of popularity; and,
    making the combined figure of merit available to qualified users for use in selecting a particular presentation.

2. The method of claim 1, wherein the step for determining the financial compensation further comprises the step of calculating such financial compensation as a function of at least one figure of merit.

3. The method of claim 2, wherein the step for aiding users in the selection of a particular educational presentation further comprises the steps of:
   automatically identifying qualified users who receive regular classroom instruction from presenters carrying out their duties as public and private school teachers; and,
   automatically offering any such user the educational presentation of that teacher when such user selects a topic for which an educational presentation by such teacher is stored in the digital media.

4. A method of teaching comprising the processor implemented steps of:
   for qualified users, providing access restricted Internet access to a plurality of academic educational presentations created by educators for the benefit of school students;
   the presentations stored in digital media, each said presentation teaching the same topic and being made by a different presenter;
   collecting financial compensation from a plurality of qualified users;
   obtaining a first indicia of popularity for each educational presentation by tracking the number of times each educational presentation has been replayed;
   the processor inferring one or more presentation figures of merit from the first indicia of popularity;
   obtaining a second indicia of popularity for each presenter by tracking the number of times each presenter has been replayed;
   the processor inferring one or more presenter figures of merit from the second indicia of popularity;
   the processor inferring one or more combined figures of merit, each combined figure of merit being a function of both the first and second indicia of popularity;
   making at least one of the figures of merit available to qualified users for use in selecting a particular educational presentation;
   the processor calculating an amount of financial compensation to be paid to at least one presenter as a function of at least one figure of merit;
   automatically identifying qualified users who receive regular classroom instruction from presenters carrying out their duties as public and private school teachers; and,
   automatically offering any such user the educational presentation of that teacher when such user selects a topic for which an educational presentation by such teacher is stored in the digital media.

5. A student-centric method of making suitable pre-recorded access restricted educational presentations available to students comprising the processor implemented steps of:
   contracting for a plurality of academic educational presentations created by educators for the benefit of school students;
   the presentations on a plurality of topics by a plurality of presenters, each of the topics being presented by a plurality of presenters;
   capturing the presentations using microphones, video cameras, one or more image capture devices including an electronic whiteboard and production controls;
   processing the captured presentations through audio, video and output processors;
   storing the captured presentations in digital media;
   uploading the captured presentations to an internet accessible digital media storage device;
   serving up the presentations via an educational presentation service including an application server in response to qualified user requests to play the presentations;
   serving up presentations to qualified users;
   maintaining a history of the number of replays of each presentation;
   the processor calculating quantitative presentation specific first popularity metrics based on the number of replays of each presentation;
   the processor calculating quantitative presenter specific second popularity metrics based on the number of replays of each presenter;
   the processor calculating quantitative hybrid third popularity metrics based on presentation specific popularity and presenter specific popularity; and,
   making presentation specific, presenter specific and hybrid metrics available to qualified users for the purpose of aiding such users in their selection of an educational presentation.

6. The method of claim 5 further comprising the step of designing and using the hybrid metric to aid qualified users in selecting a particular presentation when one of the presentation specific and presenter specific metrics indicates multiple presentations having the same popularity.

7. The method of claim 5 further comprising the step of providing a means for motivating presenters employers to enter an educational presentation contract by making works under such contract freely available to the presenter's regular public and private school students.

8. The method of claim 7 further comprising the step of creating a competitive marketplace for presenters by calculating presenter compensation as a function of presentation specific and presenter specific metrics.

9. The method of claim 8 wherein the step of quantitatively calculating a hybrid popularity metric includes:
   constructing a first set identifying presentations having the highest popularity;
   constructing a second set identifying presenters having the highest popularity; and,
   determining the intersection of the first and second sets.

10. The method of claim 9 further comprising;
   automatically identifying qualified users who receive regular classroom instruction from presenters carrying out their duties as public and private school teachers; and,
   automatically offering any such user the educational presentation of that teacher when such user selects a topic for which an educational presentation by such teacher is stored in the Internet accessible digital media.

* * * * *